United States Patent
Jung et al.

(10) Patent No.: US 9,900,815 B2
(45) Date of Patent: Feb. 20, 2018

(54) METHOD FOR HANDLING FREQUENCY PRIORITY BASED ON TERMINAL SUPPORTING CHARACTERISTICS IN WIRELESS COMMUNICATION SYSTEM AND APPARATUS FOR SUPPORTING SAME

(71) Applicant: LG ELECTRONICS INC., Seoul (KR)

(72) Inventors: Sunghoon Jung, Seoul (KR); Youngdae Lee, Seoul (KR); Sungjun Park, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/439,446

(22) PCT Filed: Oct. 30, 2013

(86) PCT No.: PCT/KR2013/009732
§ 371 (c)(1),
(2) Date: Apr. 29, 2015

(87) PCT Pub. No.: WO2014/069893
PCT Pub. Date: May 8, 2014

(65) Prior Publication Data
US 2015/0304919 A1 Oct. 22, 2015

Related U.S. Application Data

(60) Provisional application No. 61/721,027, filed on Nov. 1, 2012, provisional application No. 61/719,968, filed on Oct. 30, 2012.

(51) Int. Cl.
H04W 48/18 (2009.01)
H04W 36/08 (2009.01)
H04W 36/24 (2009.01)
H04W 72/04 (2009.01)
H04W 72/10 (2009.01)

(52) U.S. Cl.
CPC ............ *H04W 36/08* (2013.01); *H04W 36/24* (2013.01); *H04W 48/18* (2013.01); *H04W 72/0453* (2013.01); *H04W 72/10* (2013.01)

(58) Field of Classification Search
None
See application file for complete search history.

(56) References Cited

U.S. PATENT DOCUMENTS

2004/0219921 A1 * 11/2004 Cao .................... H04W 76/068
455/444
2009/0270103 A1 10/2009 Pani et al.
(Continued)

FOREIGN PATENT DOCUMENTS

| KR | 1020120011756 A | 2/2012 |
| KR | 1020120065425 A | 6/2012 |
| KR | 1020120115946 A | 10/2012 |

OTHER PUBLICATIONS

International Search Report from PCT/KR2013/009732, dated Jan. 29, 2014.

*Primary Examiner* — Huy D Vu
*Assistant Examiner* — Bao G Nguyen
(74) *Attorney, Agent, or Firm* — Dentons US LLP

(57) ABSTRACT

Provided in one aspect is a method for handling a frequency priority performed by a terminal in a wireless communication system. The method comprises: receiving minimum priority application request information from a network; and handling a frequency priority for cell reselection on the basis of the minimum priority application request information and the supporting characteristics of the terminal. The minimum priority application request information indicates an application of the minimum priority to a current frequency of the terminal or all frequencies of current radio access technology (RAT) of a cell which the terminal camps on. The supporting characteristic of the terminal is whether the (Continued)

terminal supports the RAT other than the current RAT. The handling of the frequency priority is a variable application of the frequency priority for the cell reselection according to the contents of the minimum priority application request information and the supporting characteristics of the terminal.

7 Claims, 14 Drawing Sheets

(56) References Cited

U.S. PATENT DOCUMENTS

| | | | |
|---|---|---|---|
| 2010/0093350 A1* | 4/2010 | Wang | H04J 11/0093 |
| | | | 455/436 |
| 2010/0144307 A1* | 6/2010 | Wu | H04W 76/007 |
| | | | 455/404.1 |
| 2010/0216469 A1* | 8/2010 | Yi | H04W 48/20 |
| | | | 455/435.3 |
| 2010/0272064 A1* | 10/2010 | Chen | H04W 36/0083 |
| | | | 370/331 |
| 2011/0287758 A1* | 11/2011 | Aoyagi | H04W 48/12 |
| | | | 455/422.1 |
| 2012/0135732 A1 | 5/2012 | Magadi Rangaiah et al. | |
| 2014/0120915 A1* | 5/2014 | Wu | H04W 60/04 |
| | | | 455/435.3 |
| 2015/0304919 A1* | 10/2015 | Jung | H04W 48/18 |
| | | | 370/331 |

* cited by examiner

METHOD FOR HANDLING FREQUENCY PRIORITY BASED ON TERMINAL SUPPORTING CHARACTERISTICS IN WIRELESS COMMUNICATION SYSTEM AND APPARATUS FOR SUPPORTING SAME

This application is a National Stage Entry of International Application No. PCT/KR2013/0009732, filed Oct. 30, 2013, and claims the priority to and benefit of U. S. Provisional Nos. 61/719,968 filed on Oct. 30, 2012 and 61/721,027 filed on Nov. 1, 2012, all of which are hereby incorporated by reference in their entirety for all purposes as if fully set forth herein.

BACKGROUND OF THE INVENTION

Field of the Invention

The present invention relates to wireless communication and, more particularly, to a method for handling a frequency priority based on terminal supporting characteristics for cell reselection in a wireless communication system and an apparatus for supporting the same.

Related Art

3GPP (3rd Generation Partnership Project) LTE (long term evolution) which is improvement of UMTS (Universal Mobile Telecommunications System) has been introduced as 3GPP release 8. The 3GPP LTE uses OFDMA (orthogonal frequency division multiple access) in a downlink, and uses SC-FDMA (Single Carrier-frequency division multiple access) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

Due to mobility of a terminal as a mobile device, quality of a service to be provided to a current terminal is degraded or a cell capable of providing an excellent service may be detected. Accordingly, the terminal may move to a new cell, and such an operation refers to moving performing.

In a cell reselection process, the terminal selects a target cell based on a frequency priority. The terminal may acquire information on the priority through information of the system or dedicated signaling. The terminal attempts to connect with a target cell by transmitting a connection setting message. If the connection with the target cell is terminated, the terminal may receive a service from the target cell.

A connection establishment request of the terminal to a specific cell may be rejected. Accordingly, the terminal may again perform a cell reselection process. In some cases, the terminal may apply the lower priority to a frequency of a cell in which a request of the connection establishment is rejected or a Radio Access Technology (RAT) of a corresponding cell because of a cell reselection. Accordingly, a priority of the above frequency or all frequencies of the RAT may be considered to be lower than another priority set by a network Meanwhile, characteristics supported from the terminal are not considered and mobility information for moving the terminal is provided from the network. Accordingly, the service quality to be provided to the terminal may be deteriorated. Therefore, mobility information in which support characteristics of the terminal is provided so that there is a need for a method for handling a frequency priority for cell reselection.

SUMMARY OF THE INVENTION

The present invention has been made in an effort to provide a method for handling a frequency priority based on terminal supporting characteristics for cell reselection in a wireless communication system and an apparatus for supporting the same.

In an aspect, a method for handling a frequency priority by a terminal in a wireless communication system is provided. The method includes receiving minimum priority application request information from a network, handling a frequency priority for cell reselection on the basis of the minimum priority application request information and the supporting characteristics of the terminal. The minimum priority application request information indicates an application of the minimum priority to a current frequency of the terminal or all frequencies of current radio access technology (RAT) of a cell which the terminal camps on. The supporting characteristic of the terminal is whether the terminal supports the RAT other than the current RAT. The handling of the frequency priority is a variable application of the frequency priority for the cell reselection according to the contents of the minimum priority application request information and the supporting characteristics of the terminal.

When the supporting characteristics of the terminal support the other RAT, the handling of the frequency priority for cell reselection may comprise applying the minimum priority to the current frequency of the terminal indicated by the minimum priority application request information or the all frequencies of the current RAT.

When the supporting characteristics of the terminal do not support the other RAT and the minimum priority request information indicates to apply the minimum priority to the all frequencies of the current RAT, the handling of the frequency priority for cell reselection may comprise applying the minimum priority to the current frequency and applying a priority signaled from the network to other frequency.

When the supporting characteristics of the terminal do not support the other RAT and the minimum priority request information indicates to apply the minimum priority to the all frequencies of the current RAT, the handling of the frequency priority for cell reselection may comprise applying a priority signaled from the network to the all frequencies of the current RAT.

When the supporting characteristics of the terminal do not support the other RAT and the minimum priority request information indicates to apply the minimum priority to the all frequencies of the current RAT, the handling of the frequency priority for cell reselection may comprise applying a same specific priority to the all frequencies of the current RAT.

The method may further comprise transmitting terminal supporting characteristics information indicating supporting characteristics of the terminal to the network.

When the terminal supporting characteristics information indicates that the terminal supports the other RAT, the minimum priority application request information may indicate to apply the minimum priority to the current frequency of the terminal or the all frequencies of the current RAT. When the terminal supporting characteristics information indicates that the terminal does not support the other RAT, the minimum priority application request information may indicate to apply the minimum priority to the current frequency of the terminal.

The method may further comprise receiving information indicating whether to allow transmission of the terminal supporting characteristics information. The terminal supporting characteristics information may be transmitted when the transmission is allowed.

The terminal supporting characteristics information may be included in a radio resource control (RRC) connection setting request message in order to request RRC connection establishment with the network by the terminal to be transmitted.

The minimum priority application request information may be included in an RRC connection rejection message transmitted as a rejection with respect to the RRC connection establishment request to be transmitted.

The method may further comprise performing the cell reselection based on the handled cell reselection priority.

In another aspect, a wireless apparatus operating in a wireless communication system is provided. The wireless apparatus includes a Radio Frequency (RF) unit that sends and receives radio signals and a processor that is functionally coupled to the RF unit and operates, wherein the processor is configured to receive minimum priority application request information from a network; and to handle a frequency priority for cell reselection on the basis of the minimum priority application request information and the supporting characteristics of the terminal. The minimum priority application request information indicates an application of the minimum priority to a current frequency of the terminal or all frequencies of current radio access technology (RAT) of a cell which the terminal camps on. The supporting characteristic of the terminal is whether the terminal supports the RAT other than the current RAT. The handling of the frequency priority is a variable application of the frequency priority for the cell reselection according to the contents of the minimum priority application request information and the supporting characteristics of the terminal.

In accordance with an embodiment of the present invention, even if other RAT is not supported, it is possible to prevent an illogical operation of a network for moving a terminal to another RAT according to RRC connection rejection. As a result, the terminal may select a cell of another frequency of an RAT within a range supported from the terminal or a current frequency. Accordingly, an action of the terminal which is not predicted from the network may be prevented and service continuity with respect to the terminal may be improved.

DESCRIPTION OF EXEMPLARY EMBODIMENTS

Figure 1:
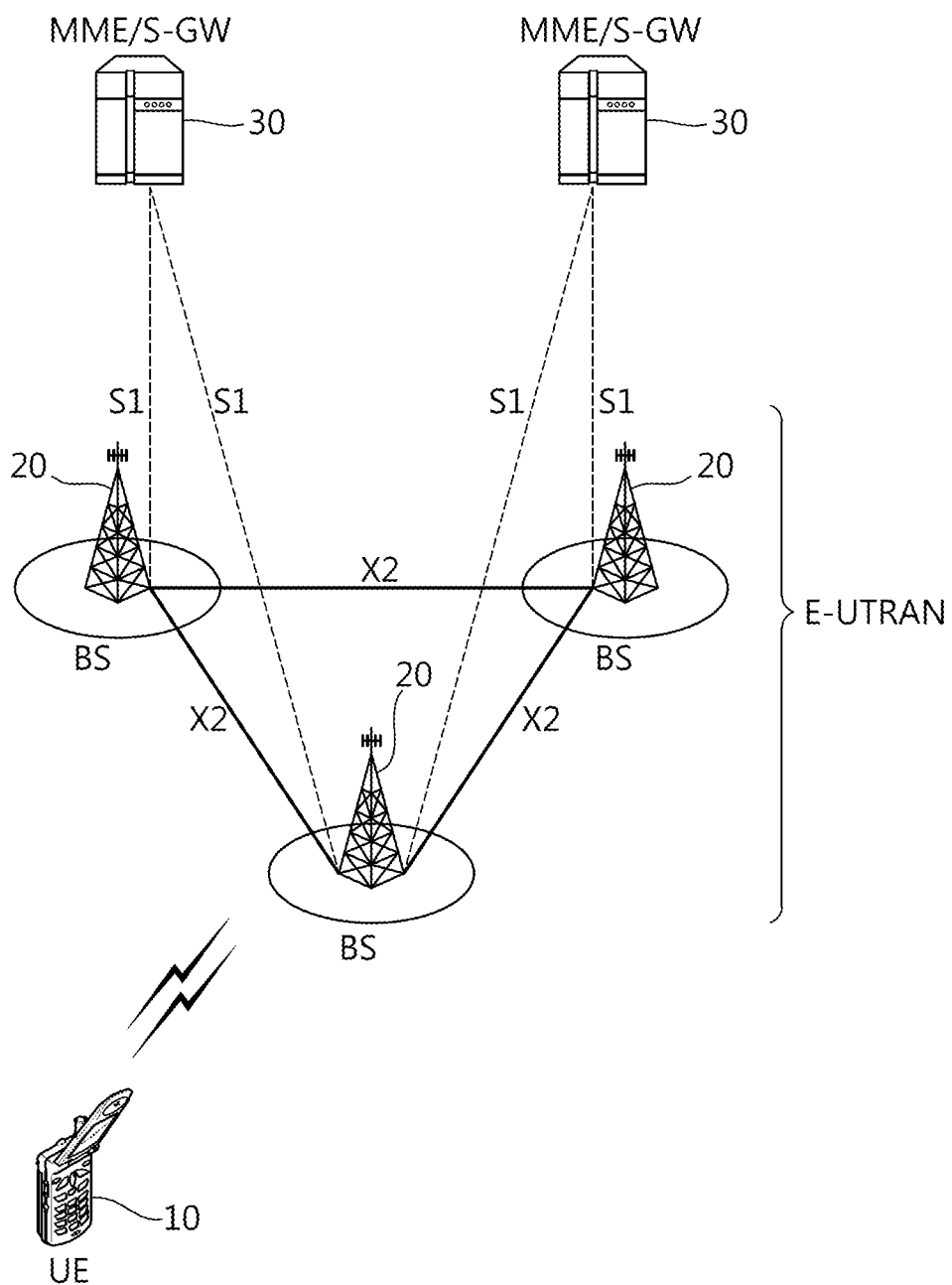
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
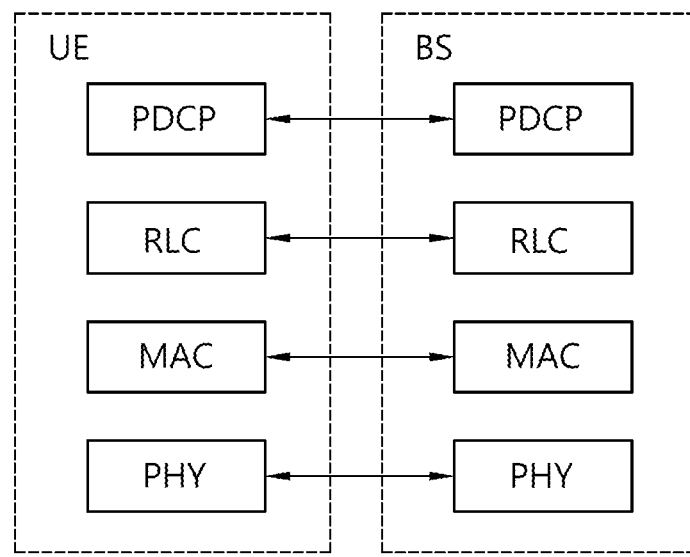
FIG. 2 is a block diagram illustrating a radio protocol architecture for a user plane.
Figure 3:
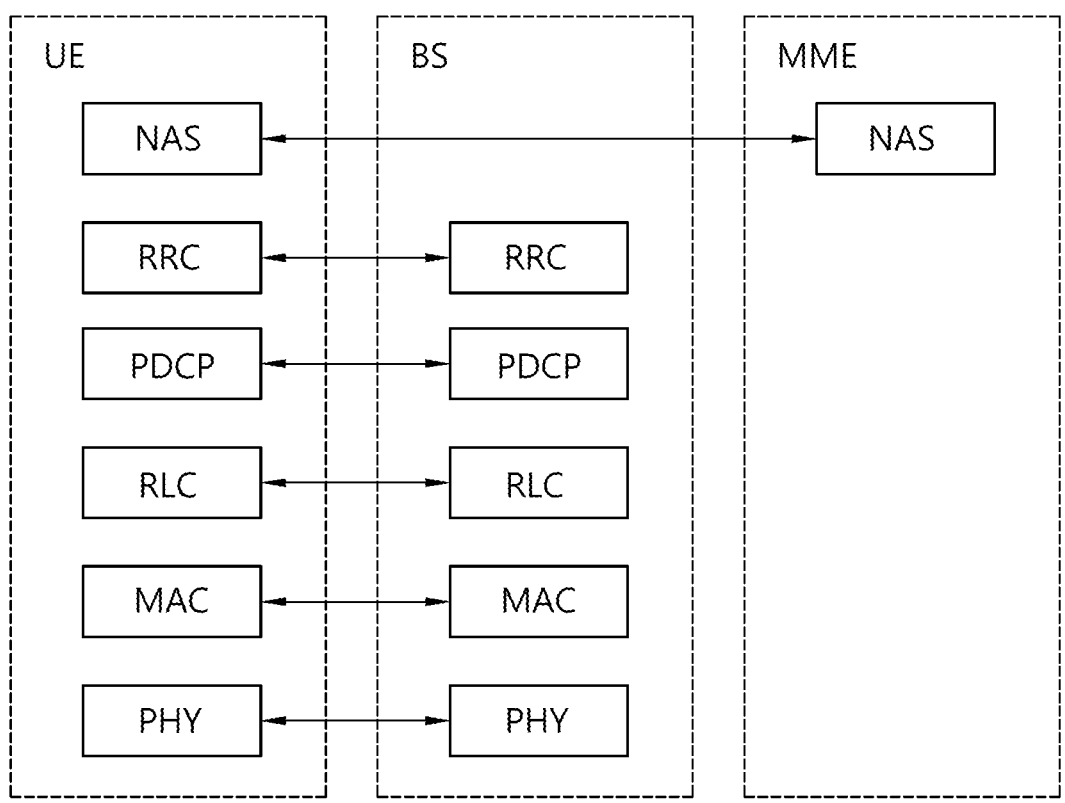
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Next, the system information will be described.

The system information includes necessary information which the UE needs to known so as to be connected to the BS. Accordingly, the UE needs to receive all the system information before being connected to the BS, and further, needs to have latest system information at all times. In addition, since the system information is information to be known by all the UE in one cell, the BS periodically transmits the system information. The system information is divided into a master information block (MIB) and a plurality of system information blocks (SIBs).

The MIB may include the limited number of parameters which are most essentially required and most frequently transmitted to be acquired for other information from a cell. The terminal firstly finds the MIB after downlink synchronization. The MIB may include information such as a downlink channel bandwidth, PHICH setting, an SFN to support synchronization and operated at a timing reference, and eNB transmission antenna setting. The MIB may be broadcasted and transmitted on the BCH.

A SystemInformationBlockType1 (SIB1) of the SIBs is included in a "SystemInformationBlockType1" message to be transmitted. Remaining SIBs except for the SIB1 is included in a system information message to be transmitted. To map the SIBs to the system information message may be flexibly set according to a schedule information list parameter included in the SIB1. However, each SIB is included in a single system information message. Only SIBs having the same scheduling required value (e.g. period) may be mapped to the same system information message. Further, a SystemInformationBlockType2 (SIB2) may be always mapped to a system information message corresponding to a first entry in a system information message list of the scheduling information list. A plurality of system information messages may be transmitted within the same period. A SIB1 and all system information messages are transmitted on a DL-SCH.

In addition to the broadcast transmission, E-UTRAN may be dedicatedly signaled in a state that the SIB1 includes a parameter set similar to an existing preset value. In this case, the SIB1 may be included in an RRC connection to be transmitted.

The SIB1 includes information on cell access, and defines the scheduling of other SIBs. The SIB1 may include identifiers of a PLMN network, a Tracking Area Code (TAC) and a cell ID, a cell barring status indicative of whether the cell is camps on, a minimum reception level required in a cell to be used as cell selection criteria, and information on transmission time and periods of the other SIBs.

The SIB2 may include wireless resource setting information that is common to all terminals. The SIB2 may include an uplink carrier frequency and an uplink channel bandwidth, RACH setup, paging configuration, uplink power control configuration, sounding reference signal configuration, PUCCH configuration to support ACK/NACK transmission, and information on PUSCH configuration.

The terminal may apply acquisition and change detection process of system information with respect to only a PCell. In the SCell, the E-UTRAN may provide all system information on RRC connection state operation when the SCell is added through dedicated signaling. When system information associated with the set SCell is changed, the E-UTRAN may release a considered SCell and add the SCell afterward. This may be performed together with a single RRC connection reset message. The E-UTRAN may set a broadcasted value in the considered SCell and other parameters through dedicated signaling.

The terminal should ensure validity with respect to a specific type of system information. The above system information refers to required system information. The required system information may be defined as follows.

When the terminal is in an RRC idle state: the terminal should be ensured to valid versions of MIB and SIB1 as well as SIB2 to SIB8. This may depend on supporting of a considered RAT.

When the terminal is in an RRC connection state: the terminal should be ensured to include valid versions of MIB, SIB1, and SIB2.

In general, validity of system information may be ensured to maximum three hours after acquisition.

Generally, services provided to the UE by the network may be divided into three types to be described below. Further, the UE differently recognizes the cell type according to which service may be provided. First, the services types will be described below, and then the cell types will be described.

1) Limited service: The service provides an emergency call and an earthquake and tsunami warning system (ETWS), and may be provided in an acceptable cell.

2) Normal service: The service means a public use of a general use, and may be provided in a suitable or normal cell.

3) Operator service: The service means a service for a communication network operator, and the cell may be used by only the communication network operator and may not be used by a general user.

In relation to the service type provided by the cell, the cell types may be divided below.

1) Acceptable cell: A cell in which the UE may receive the limited service. The cell is a cell which is not barred and satisfies a cell selection reference of the UE in the corresponding UE.

2) Suitable cell: A cell in which the UE may receive the normal service. The cell satisfies a condition of the acceptable cell and simultaneously satisfies additional conditions. As the additional conditions, the cell needs to belong to a public land mobile network (PLMN) to which the corresponding UE may be connected and be a cell in which the performance of the tracking area updating procedure of the UE is not barred. When the corresponding cell is a CSG cell, the UE needs to be a cell to be connected to the corresponding cell as the CSG member.

3) Barred cell: The cell is a cell which broadcasts information on a cell barred through the system information.

4) Reserved cell: The cell is a cell which broadcasts information on a cell reserved through the system information.

Figure 4:
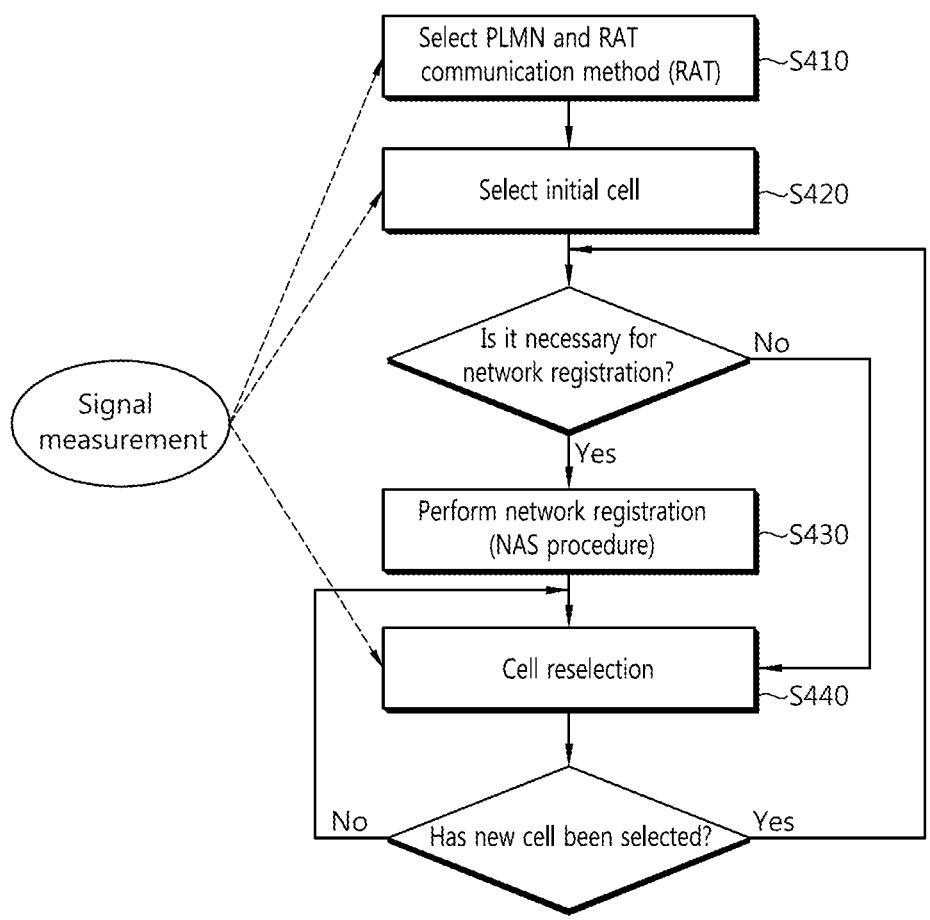
FIG. 4 is a flowchart illustrating an operation of the UE in the RRC idle state.

FIG. 4 is a flowchart illustrating an operation of the UE in the RRC idle state. FIG. 4 illustrates a procedure of registering a UE in which initial power is turned on in the network through a cell selection process and reselecting the cell if necessary.

Referring to FIG. 4, the UE selects a radio access technology (RAT) for communicating with the PLMN which is a network to receive the service (S410). Information on the PLMN and the RAT may be selected by the user of the UE, and stored in a universal subscriber identity module (USIM) to be used.

The UE selects the measuring BS and a cell having largest value among cells in which signal intensities and quality measured from the BS are larger than a predetermined value (Cell Selection) (S420). This is performing the cell selection by the turned-on UE and may be called initial cell selection. The cell selection procedure will be described below. After the cell selection, the UE receives system information which the BS periodically transmits. The aforementioned predetermined value means a value defined in the system for ensuring the quality for the physical signal in the data transmission/reception. Accordingly, the value may vary according to the applied RAT.

The UE performs a network registering procedure in the case where network registering is required (S430). The UE registers self-information (e.g., IMSI) in order to receive a service (e.g., paging) from the network. The UE needs not to be registered in the connected network whenever selecting the cell, but is registered in the network in the case where information (e.g., tracking area identity (TAI)) on the network received from the system information and information on a network which is known to the UE.

The UE performs cell reselection based on a service environment, a UE environment, or the like which is provide by the cell (S440). The UE selects one of other cells providing a better signal characteristic than the cell of the BS to which the UE is connected, when the value of the intensity or the quality of the signal measured from the BS receiving the service is a value measured from the BS of the neighbor cell. This process is distinguished from the initial cell selection of the second process to be called cell re-selection. In this case, in order to prevent the cell from being frequently reselected depending on the change in signal characteristic, there is a temporal constraint. The cell re-selection procedure will be described below.

Figure 5:
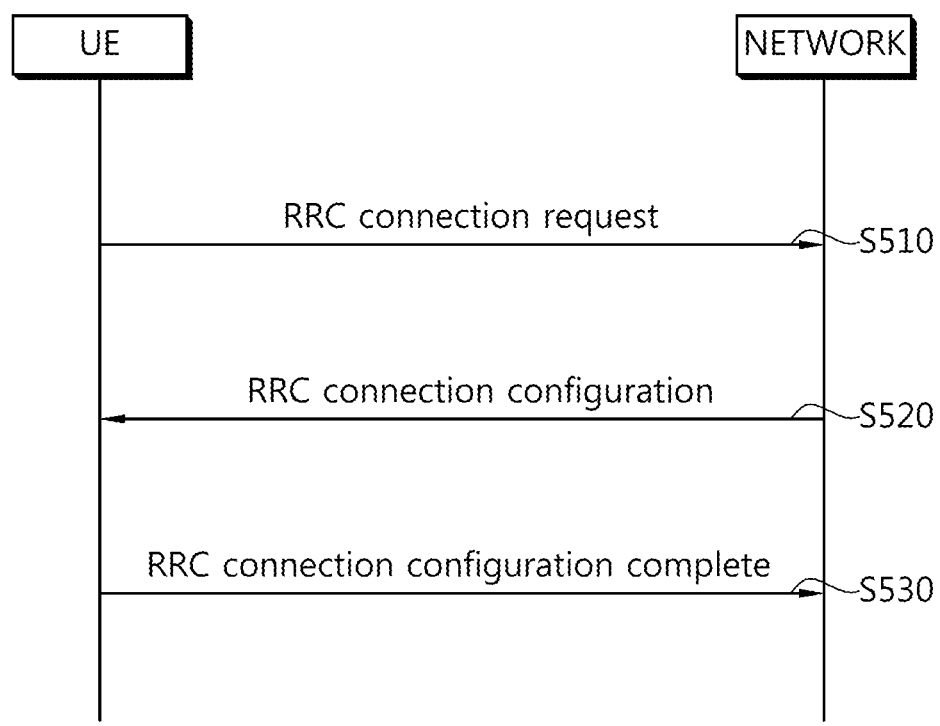
FIG. 5 is a flowchart illustrating a process of establishing RRC connection.

FIG. 5 is a flowchart illustrating a process of establishing RRC connection.

The UE transports an RRC connection request message requesting the RRC connection to the network (S510). The network transports an RRC connection setup message in a response for the RRC connection request (S520). After receiving the RRC connection setup message, the UE enters an RRC connection mode.

The UE transports to the network an RRC connection setup complete message used for verifying successful completion of the RRC connection establishment (S530).

Figure 6:
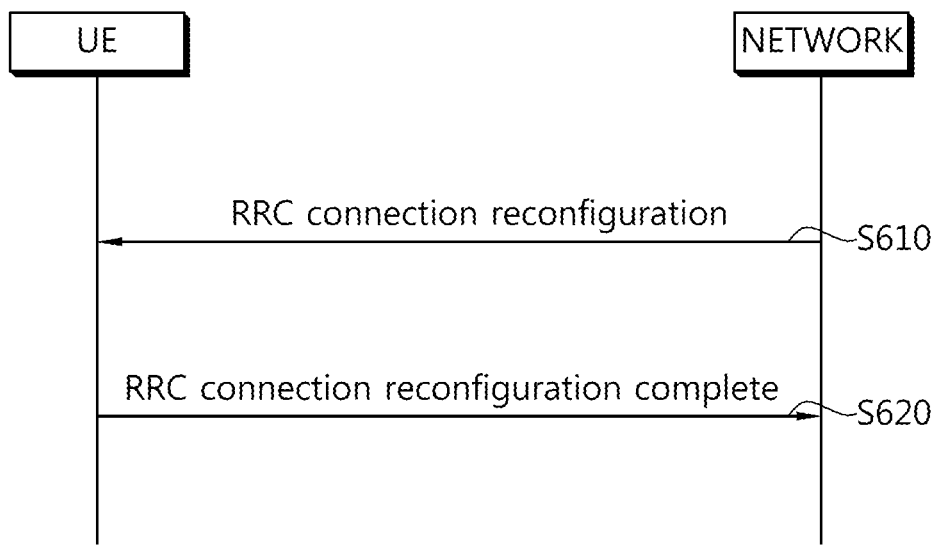
FIG. 6 is a flowchart illustrating an RRC connection reconfiguration process.

FIG. 6 is a flowchart illustrating an RRC connection reconfiguration process. The RRC connection reconfiguration is used for modifying the RRC connection. The RRC connection reconfiguration is used for RB establishment/modify/release, handover performance, and measurement setup/modify/release.

The network transports to the UE an RRC connection reconfiguration message for modifying the RRC connection (S610). The UE transports to the network an RRC connection reconfiguration complete message used for verifying successful completion of the RRC connection reconfiguration, as a response to the RRC connection reconfiguration (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

The UE searches a usable PLMN and selects a suitable PLMN which may receive the service when the power is turned on in an initial stage. The PLMN is a network which is deployed or operated by a mobile network operator. Each mobile network operator operates one or more PLMNs. Each PLMN may be identified by a mobile country code (MCC) and a mobile network code (MNC). PLMN information of the cell is included in the system information to be broadcasted. The UE attempts to register the selected PLMN. When the registration is completed, the selected PLMN becomes a registered PLMN (RPLMN). The network may signal a PLMN list to the UE, and PLMNs included in the PLMN list may be considered as the PLMN such as the RPLMN. The UE registered in the network needs to be reachable by the network at all times. If the UE is in the ECM-CONNECTED state (equally, the RRC connection state), the network recognizes that the UE receives the service. However, when the UE is in the ECM-IDLE state (equally, the RRC idle state), the situation of the UE is not valid in the eNB, but stored in the MME. In this case, the position of the UE is in the ECM-IDLE state is notified to only the MME with granularity of the list of the tracking areas (TAs). A single TA is identified by a tracking area identity (TAI) constituted by a PLMN identity to which the TA belongs and a tracking area code (TAC) uniquely expressing the TA in the PLMN.

Next, among the cells provided by the selected PLMN, the UE selects a cell having signal quality and characteristic which may receive a suitable service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

The cell selection process is largely divided to two processes.

First, as an initial cell selection process, the UE has no previous information on the radio channel in this process. Accordingly, the UE searches all radio channels in order to find a suitable cell. The UE finds the strongest cell in each channel. Thereafter, when the UE just finds the suitable cell stratifying a cell selection reference, the UE selects the corresponding cell.

Next, the UE may select the cell by using the stored information or using information broadcasted in the cell. Accordingly, the cell selection may be quickly performed as compared with the initial cell selection process. The UE selects the corresponding cell when just finding the cell satisfying the cell selection reference. If the UE does not find the suitable cell satisfying the cell selection reference through the process, the UE performs the initial cell selection process.

After the UE selects any cell through the cell selection process, the intensity or the quality of the signal between the UE and the BS may be changed according to mobility of the UE, a change in radio environment, or the like. Accordingly, when the quality of the selected cell deteriorates, the UE may select another cell providing better quality. As such, in the case of selecting the cell again, generally, the UE selects the cell providing better signal quality than the currently selected cell. This process is called cell reselection. The cell reselection process generally has a primary object to select a cell providing the best quality to the UE in terms of the quality of the radio signal.

In addition to the quality of the radio signal, the network determines a priority for each frequency to notify the determined priority to the UE. In the UE receiving the priority, the priority is first considered as compared the radio signal quality reference in the cell reselection process.

As such, there is the method of selecting or reselecting the cell according to a signal characteristic in the radio environment, and in the case of selecting the cell for reselection during the cell reselection, there may be methods of reselecting the cell according to a RAT of the cell and a frequency characteristic below.

Intra-frequency cell reselection: The UE reselects a cell having the same RAT and the same center-frequency as the cell during camping.

Inter-frequency cell reselection: The UE reselects a cell having the same RAT as and a different center-frequency from the cell during camping.

Inter-RAT cell reselection: The UE reselects a cell using a different RAT from the RAT during camping.

A principle of the cell reselection process is as follows.

First, the UE measures the quality of the serving cell and the quality of the neighbor cell for the cell reselection.

Second, the cell reselection is performed based on a cell reselection reference. The cell reselection reference has the following characteristics in association with the measurement of the serving cell and the neighbor cell.

The intra-frequency cell reselection is basically based on ranking. The ranking is an operation of defining index values for evaluating the cell reselection and ranking cells in an order of sizes of the index values by using the index values. A cell having the best index value is commonly called a best ranked cell. The cell index value is based on a value measured by the UE with respect to the corresponding cell and is a value applying a frequency offset or a cell offset if necessary.

The inter-frequency cell reselection is based on a frequency priority provided by the network. The UE attempts to camp on in a frequency having the highest frequency priority. The network may provide a frequency priority to be commonly applied to the UEs in the cell through the broadcast signaling or provide a priority for each frequency for every UE through dedicated signal for each UE. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, the network may provide parameters (for example, a frequency-specific offset) used in the cell reselection to the UE for each frequency.

For the intra-frequency cell reselection or the inter-frequency cell reselection, the network may provide a neighbor cell list (NCL) used in the cell reselection to the UE. The NCL includes cell-specific parameters (for example, a cell-specific offset) used in the cell reselection.

For the intra-frequency cell reselection or the inter-frequency cell reselection, the network may provide a cell reselection black list used in the cell reselection to the UE. The UE does not perform the cell reselection with respect to the cell included in the black list.

Next, the ranking performed in the cell reselection evaluating process will be described.

A ranking criterion used to give the priority of the cell is defined by Equation 1.

$$R_S = Q_{meas,s} + Q_{hyst}, \quad R_n = Q_{meas,n} - Q_{offset} \qquad \text{[Equation 1]}$$

Here, $R_s$ represents a ranking criterion of the serving cell, $R_n$ represents a ranking criterion of the neighbor cell, $Q_{meas,s}$ represents a quality value measured with respect to the serving cell by the UE, $Q_{meas,n}$ represents a quality value measured with respect to the neighbor cell by the UE, $Q_{hyst}$ represents a hysteresis value for ranking, and $Q_{offset}$ represents an offset between the both cells.

In the intra-frequency, when the UE receives the offset $Q_{offsets,n}$ between the serving cell and the neighbor cell, $Q_{offset} = Q_{offsets,n}$, and when the UE does not receive $Q_{offsets,n}$, $Q_{offset} = 0$.

In the inter-frequency, when the UE receives the offset $Q_{offsets,n}$ for the corresponding cell, $Q_{offset} = Q_{offsets,n} + Q_{frequency}$, and when the UE does not receive $Q_{offsets,n}$, $Q_{offset} = Q_{frequency}$.

When the ranking criterion Rs of the serving cell and the ranking criterion Rn of the neighbor cell are changed in a similar state, the ranking order is frequently reversed as the changing result, and as a result, the UE may alternately reselect the two cells. Qhyst is a parameter for preventing the UE from alternately reselecting the two cells by giving the hysteresis in the cell reselection.

The UE measures the Rs of the serving cell and the Rn of the neighbor cell according to the Equation 1, regards the cell having the largest ranking criterion value as the best ranked cell, and selects the cell.

According to the reference, it can be seen that the quality of the cell acts as the most important reference in the cell reselection. When the reselected cell is not the suitable cell, the UE excludes the corresponding frequency or the corresponding cell from the cell reselection target.

Hereinafter, a radio link failure (RLF) will be described.

The UE continuously performs the measurement in order to maintain the quality of the radio link with the serving cell receiving the service. The UE determines whether the communication is impossible in the current situation due to deterioration of the quality of the radio link. When the communication is almost impossible due to the low quality of the serving cell, the UE determines the current situation as a radio link failure.

When the radio link failure is determined, the UE gives up the communication maintenance with the current serving cell, selects a new cell through the cell selection (or cell reselection) procedure, and attempts the RRC connection re-establishment to the new cell.

In a specification of 3GPP LTE, cases where the normal communication is impossible are exemplified below:
- a case where the UE determines that there is a serious problem in the downlink communication link quality based on the radio quality measuring result of the PHY layer (determines that the quality of the PCell is low during the RLM.
- a case where the UE determines that there is a problem in the uplink transmission when a random access procedure is continuously failed in a MAC sub-layer.
- a case where the UE determines that there is a problem in the uplink transmission when uplink data transmission is continuously failed in an RLC sub-layer.
- a case where the UE determines that the handover is failed.
- a case where a massage received by the UE does not pass through an integrity check.

Hereinafter, the RRC connection re-establishment procedure will be described in more detail.

Figure 7:
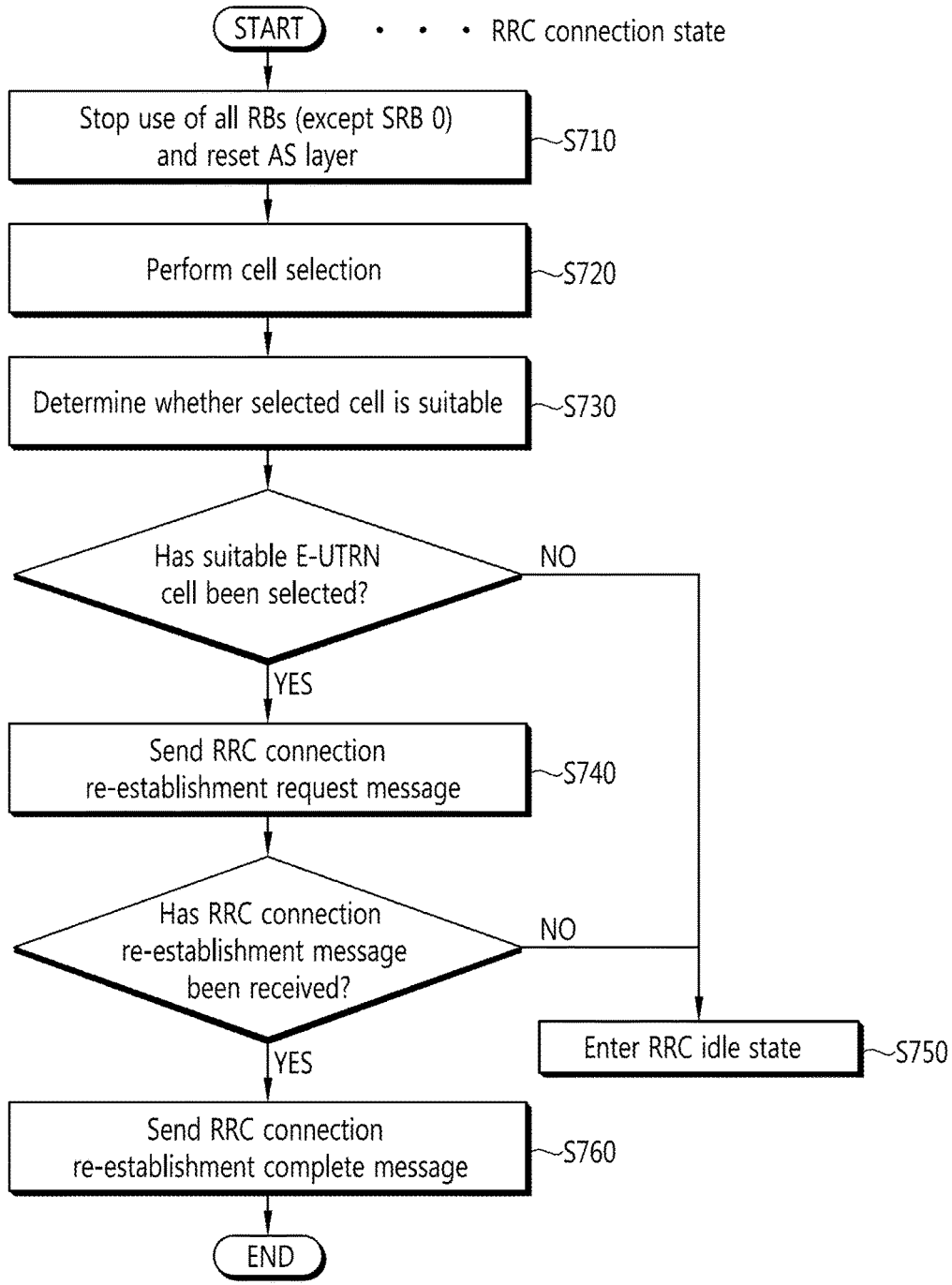
FIG. 7 is a diagram illustrating a RRC connection re-establishment procedure.

FIG. 7 is a diagram illustrating a RRC connection re-establishment procedure.

Referring to FIG. 7, the UE stops the used of all radio bearers which have been set except for signaling radio bearer #0 (SRB 0) and initializes each sub-layer of the AS (S710). Further, each sub-layer and the PHY layer are set as a default configuration. The UE maintains the RRC connection state during such a process.

The UE performs a cell selection procedure for performing the RRC connection reconfiguration procedure (S720). The cell selection procedure in the RRC connection reconfiguration procedure may be performed the same as the cell selection procedure performed in the RRC idle state of the UE even though the UE maintains the RRC connection state.

The UE verifies the system information of the corresponding cell to determine whether the corresponding cell is a suitable cell or not, after performing the cell selection procedure (S730). When it is determined that the selected cell is the suitable E-UTRAN cell, the UE transmits an RRC connection reestablishment request message to the corresponding cell (S740).

Meanwhile, when it is determined that the cell selected through the cell selection procedure for performing the RRC connection reestablishment procedure is the cell using the RAT other than the E-UTRAN, the UE stops the RRC connection reestablishment procedure and enters the RRC idle state (S750).

The UE may be implemented so that the cell selection procedure and the suitability verification of the cell by receiving the system information of the selected cell are finished within a limited time. To this end, the UE may drive a timer according to the starting of the RRC connection reestablishment procedure. The timer may stop when it is determined that the UE selects the suitable cell. When the timer ends, the UE may regard that the RRC connection reestablishment procedure is failed and enter the RRC idle state. The timer is hereinafter referred to as a radio link failure timer. In LTE specification TS 36.331, a timer called T311 may be used as the radio link failure timer. The UE may acquire the setting value of the timer from the system information of the serving cell.

In the case of receiving and accepting the RRC connection reestablishment request message from the UE, the cell transmits a RRC connection reestablishment message to the UE.

The UE receiving the RRC connection reestablishment message from the cell reconfigures the PDCP sub-layer and the RLC sub-layer for the SRB1. Further, the UE calculates various key values related with security setting and reconfigures the PDCP sub-layer responsible for the security with newly calculated security key values. As a result, the SRB 1 between the UE and the cell is opened, and the RRC control message may be transmitted and received. The UE completes the restarting of the SRB1, and transmits to the cell an RRC connection reestablishment complete message that the RRC connection reestablishment procedure is completed (S760).

On the contrary, in the case of receiving and rejecting the RRC connection reestablishment request message from the UE, the cell transmits a RRC connection reestablishment reject message to the UE.

When the RRC connection reestablishment procedure is successfully performed, the cell and the UE perform the RRC connection reestablishment procedure. As a result, the UE restores a state before performing the RRC connection reestablishment procedure and maximally secures continuity of the service.

Hereinafter, an operation of the terminal and the network associated with the RRC connection rejection will be described. In the RRC connection establishment process, when the network transmit an RRC connection rejection message to the terminal corresponding to the RRC connection request message of the terminal, the network may not allow access of the terminal with respect to a corresponding cell and the RAT of the corresponding cell according to a current situation of the network. To this end, the network may add information on a reselection priority and/or access limitation information for limiting cell access to the RRC connection rejection message to block access of the network with respect to the terminal.

The network may cause the network to add minimum priority request information indicating to apply a minimum priority to the RRC connection rejection message in order to perform the cell reselection. The minimum priority request information may include minimum priority type information indicating a type to which the minimum priority is applied and minimum priority timer information being an application sustain time of the minimum priority. The minimum priority type information may be configured to indicate to apply the minimum priority with respect to a frequency of a cell transmitting the RRC connection rejection message or to apply the minimum priority with respect to all frequencies of an RAT of the corresponding cell.

If the terminal receives the RRC connection rejection message including the minimum priority request information, the terminal may perform cell reselection by starting a time set to the minimum priority application sustain time, and applying the minimum priority with respect to a target indicated by the minimum priority type information.

Meanwhile, when the minimum priority information is provided through the RRC connection rejection message, the minimum priority information may collide with the reselection priority signaled by the network. In this case, the terminal may be implemented to be operated by preferentially applying the minimum priority with respect to a specific frequency according to the minimum priority information provided through the RRC connection rejection message. In addition, the minimum priority information according to the RRC connection rejection message may collide applying of an implicit priority according to an UE-originated indication such as a Multimedia Broadcast Multicast Service (MBMS) interest indicator, an proxy indicator associated with a Closed Subscriber Group (CSG), an IDC indicator associated with the IDC interference, and an IDC indicator associated with the IDC interference. Accordingly, the priority to be preferentially applied may depend on implementation of the terminal or the network.

The network may add wait time information to the RRC connection rejection message in order to limit access of the terminal with respect to the network. If the terminal receives the RRC connection rejection message including the wait time information, the terminal may set a wait timer by an indicated sustain time to start. While the wait timer is operated, the terminal may not perform the RRC connection establishment process for accessing to the network.

The network may add extended wait time information to the RRC connection rejection message for a delay tolerant UE which is an adaptive terminal with respect to a delayed service. The extended wait time information may be implemented to indicate an extended wait sustain time value long than a value of the above wait time information. When the extended wait time information is included in the RRC connection rejection message and the corresponding terminal is the delay tolerant terminal, the terminal may perform network access based on the extended wait time information. In contrast, when the terminal is not the delay tolerant terminal, the terminal may perform the network access based on the wait time information.

As described above, when the RRC connection setting request of the terminal is rejected, the terminal may receive the minimum priority application request information and apply the minimum priority to at least one frequency indicated by the corresponding information and/or all frequencies of the specific RAT. Meanwhile, in a state that the terminal supports only the specific RAT, when the minimum priority application request information indicates to apply the minimum priority to all frequencies of the corresponding RAT, a reference for selecting a cell by the terminal is not clearly defined. In other words, according to the minimum priority request information, when the terminal applies the minimum priority to all frequencies of the corresponding RAT, a reference to be moved to a specific frequency or avoid the movement is not clear. This causes a problem where the network has a difficulty in predicting an operation of the terminal. The above problem may occur when the terminal supports a serving frequency of a current RAT but does not support another frequency of the same RAT. In order to compensate for the occurred problem, there is a need to suggest a method of taking into consideration support characteristic of the terminal when handling the frequency priority for cell reselection of the terminal.

Figure 8:
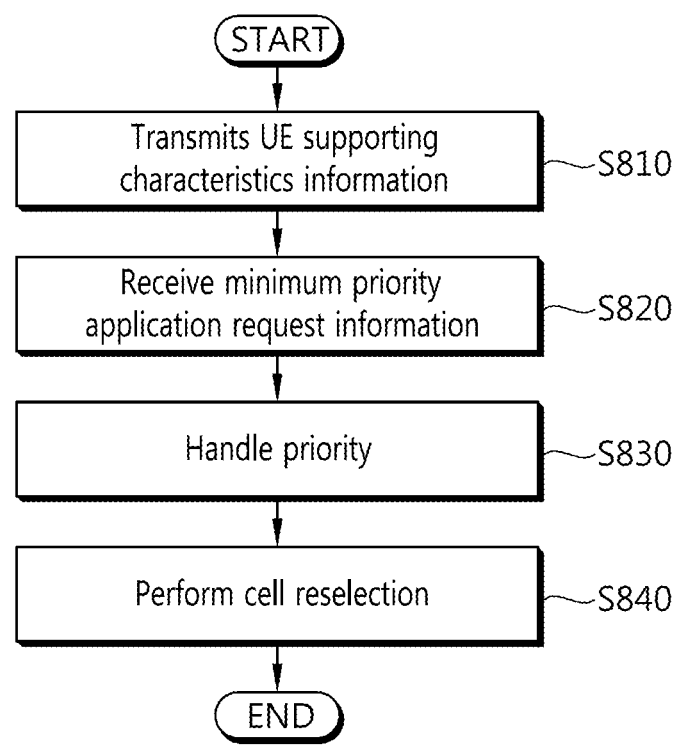
FIG. 8 is a diagram illustrating a method for handling a frequency priority based on terminal supporting characteristics according to an embodiment of the present invention.

FIG. 8 is a diagram illustrating a method for handling a frequency priority based on terminal supporting characteristics according to an embodiment of the present invention.

Referring to FIG. 8, the terminal transmits UE supporting characteristics information to the network (S810). The UE supporting characteristics information may indicate whether the terminal supports an operation in another RAT except for the current RAT. The UE supporting characteristics information may indicate whether the terminal supports another frequency of the same RAT except for a current frequency of the current RAT.

The UE supporting characteristics information may be included in the RRC connection setting request message and the RRC connection setting request message is transmitted to the network in order to request connection in an RRC connection establishment process with the network. The RRC connection setting request message may include very limited size of information to be included. Accordingly, a flag type of UE supporting characteristics information is implemented to be set to indicate whether the terminal supports another RAT or the terminal supports another frequency of the current RAT. When the current terminal camps on an E-UTRAN based LTE, indication of the UE supporting characteristics information that the terminal does not support another RAT may be implemented by indicating whether the terminal supports only the E-UTRAN.

Since the UE supporting characteristics information may be implemented as information having a sufficient size than that of the above flat type, the UE supporting characteristics information may be configured to include a RAT list capable of supporting by the terminal and/or a frequency list of current RAT to be supported from the terminal.

If the terminal may support another RAT according to mobility information for another RAT provided from the network (e.g., cell reselection information associated with another RAT). The other RAT may be an accessible RAT achieved from a result of a priority lowering application with respect to the current RAT.

When the current RAT is the E-UTRAN, the other RAT may be an UTRAN and a GERAN. Further, another RAT may be a CDMA.

The transmission of the UE supporting characteristics information by the terminal may be controlled by the network during an RRC connection establish process. The network may broadcast flag type indication information indicating whether to allow transmission of the UE supporting characteristics information or to transmit the UE supporting characteristics information. The terminal may determine whether to support another RAT through corresponding indication information or whether to transmit UE supporting characteristics information indicating whether to support another frequency of a current RAT to the network during the RRC connection establishment process.

The terminal receives minimum priority application request information from the network (S820). The minimum priority application request information may be included in a RRC connection rejection message to be transmitted as a response to the RRC connection setting request message of the terminal to be transmitted. As described above, the minimum priority application request information may indicate to apply the minimum priority to a current frequency of the terminal and/or all frequencies of a specific RAT. Further, the minimum priority application request information may indicate a wait time when the terminal does not attempt the RRC connection establishment but waits. When the terminal is the delay tolerant terminal, the wait time may be an extended wait time.

When setting the minimum priority application request information, the network may set the minimum priority application request information by taking into consideration the UE supporting characteristics information. If the UE supporting characteristics information indicates that the terminal may support another RAT, the minimum application request information may be set to indicate to apply the minimum priority to the current frequency of the terminal and all frequencies of a current RAT. If the UE supporting characteristics information indicates that the terminal may support the other RAT, the minimum priority application request information may be set to indicate to apply the minimum priority to a current frequency of the terminal. However, the minimum priority application request information may not be set to indicate to apply the minimum priority to all frequencies of the current RAT.

If the UE supporting characteristics information indicates that the terminal may indicate only a current frequency of a current RAT, the minimum priority application request information may be set to indicate not to apply the minimum priority. Alternatively, it may be set to indicate to apply the minimum priority to a current frequency and/or all frequencies of the current RAT regardless of supporting characteristics of the terminal.

According to the above minimum priority application request information, a terminal supporting another RAT may acquire the minimum priority application request information indicating to apply the minimum priority to the current frequency. The terminal may apply the minimum priority to the current frequency and may select a cell which is operated at another frequency of the current RAT.

Meanwhile, the minimum priority application request information may be set to indicate to apply the minimum priority to a current frequency and/or all frequencies of a current RAT regardless of the UE supporting characteristics information. Alternatively, the network which does not receive the UE supporting characteristics information may not take into consideration the supporting characteristics of the terminal but may set and provide the minimum priority application request information.

The terminal handles a priority based on the UE supporting characteristics and the minimum priority application request information (S830).

When the terminal may support other RATs as well as a current RAT, the terminal may apply a priority to a current frequency or all frequencies of a current RAT according to indication of the minimum priority application request information. The terminal sets a value indicated by the minimum priority application request information to a minimum priority timer.

When the terminal may support only the current RAT, if the minimum priority application request information indicates to apply the minimum priority to the current frequency, the terminal may apply the priority according to the minimum priority application request information. In contrast, when the minimum priority application request information indicates to apply the minimum priority to all frequencies of the current RAT, a reference for cell reselection may be not clear on the current RAT of the terminal. Accordingly, in this case, the terminal may be implemented to automatically hand the priority. The handling the priority by the terminal may be implemented as follows.

1) The terminal may apply the minimum priority to only the current frequency (serving frequency) instead of applying the minimum priority to all frequencies of the current RAT. The terminal starts the minimum priority timer associated with application of the minimum priority to the current frequency. A timer value may be set as a value indicated by the minimum priority application information.

If the priority is signaled from the network before receiving the minimum priority application request information, the signaled priority is applicable to a corresponding frequency. For example, the terminal previously receives the minimum priority application request information. If the application of the priority according to corresponding information is valid (when the minimum priority timer is operated), the terminal may apply the minimum priority to an associated frequency. Meanwhile, a timer associated with application of the minimum priority of the current frequency and a timer associated with application of the minimum priority of other associated frequency may be independently driven and managed.

2) The terminal does not apply the minimum priority to all frequencies of the current RAT but may apply the priority signaled from the network. Accordingly, the terminal may not start the minimum priority timer or reset a timer.

The terminal may not apply the minimum priority to all frequencies of a current RAT regardless of application but may perform an operation according to reception of the RRC connection rejection message. The terminal stops a T300 timer according to transmission of the RRC connection setting request message and resets MAC (Medium Access Control), and may not start the RRC connection by starting a T302 timer by a wait time indicated by the minimum priority application request information or an extended wait time. Moreover, the terminal may report an upper layer (NAS layer) that the RRC connection request is rejected.

When the priority is signaled from the network before reception of the minimum priority application request information. For example, the terminal previously receives the minimum priority application request information. If the minimum priority application according to corresponding information is valid (when a minimum priority timer is operated), the terminal may apply the minimum priority to an associated frequency.

3) The terminal may apply the same priority with respect to all frequencies of a current RAT. It may be assumed that the terminal has the same frequency priority at all frequencies of the current RAT when performing cell reselection. In this case, cell reselection estimation of the terminal may be performed based on link with respect to a cell on all frequencies.

The terminal handling the priority performs the cell reselection according to the handled priority (S840). The terminal may perform inter-frequency cell reselection or inter-RAT cell reselection according to a frequency priority.

Figure 9:
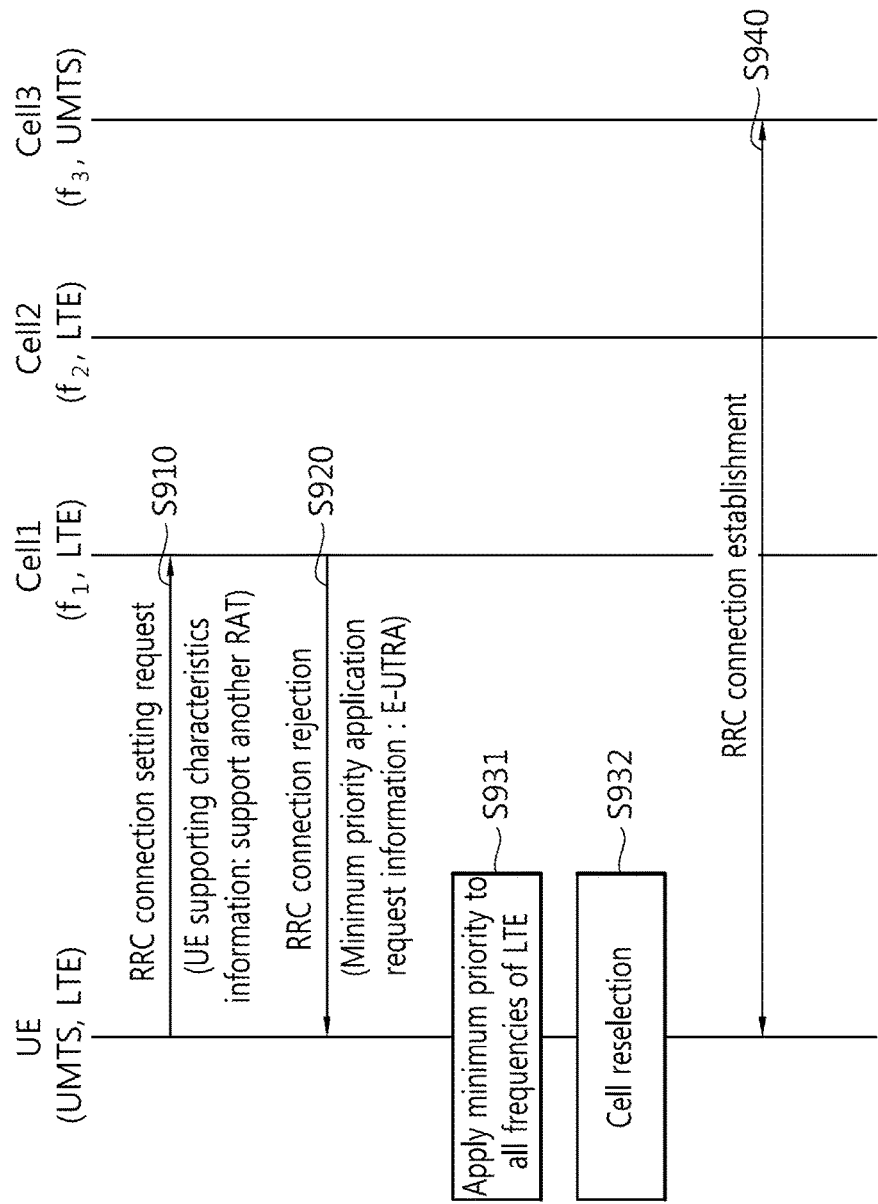
FIG. 9 is a flowchart illustrating a first example of cell reselection based on frequency priority handling according to an embodiment of the present invention.

FIG. 9 is a flowchart illustrating a first example of cell reselection based on frequency priority handling according to an embodiment of the present invention.

In the example of FIG. 9, it is assumed that the terminal may support a LTE cell and a UMTS cell, and the terminal camps on a cell 1 based on the LTE. It is assumed that the terminal has performance capable of providing UE supporting characteristics information, and receives request to provide the UE supporting characteristics information from the network. It is assumed that the frequency priority is higher in the order of $f_1$, $f_2$, and $f_3$.

The terminal transmits an RRC connection setting request message to a cell 1 for RRC connection establishment (S910). The RRC connection setting request message may include UE supporting characteristics information. The UE supporting characteristics information may indicate that the terminal may support another RAT (e.g., UMTS cell) except for the LTE cell.

The terminal receives the RRC connection rejection message from the cell 1 (S920). The RRC connection rejection message may include minimum priority application information. The cell 1 may know that the terminal may support another RAT by acquiring the UE supporting characteristics information. Accordingly, the minimum priority application information may be set to indicate to apply the minimum priority to a current frequency or all frequencies of an LTE. It is assumed that the minimum priority application information is set to indicate to apply the minimum priority to all frequencies of one LTE based on the E-UTRA.

The terminal applies the minimum priority to all frequencies of the LTE according to the minimum priority application request information (S931), and performs cell reselection (S932). The terminal may apply the minimum priority to frequencies $f_1$ and $f_2$ and may apply a priority signaled from the network to a frequency $f_3$. Accordingly, the terminal may select a cell 3 being an UMTS cell as a target cell, and may camp on the cell 3. The terminal may drive a minimum priority timer associated with the minimum priority application with respect to all frequencies of an LTE cell.

The terminal may perform an RRC connection establishment process with a cell 3 (S940).

Figure 10:
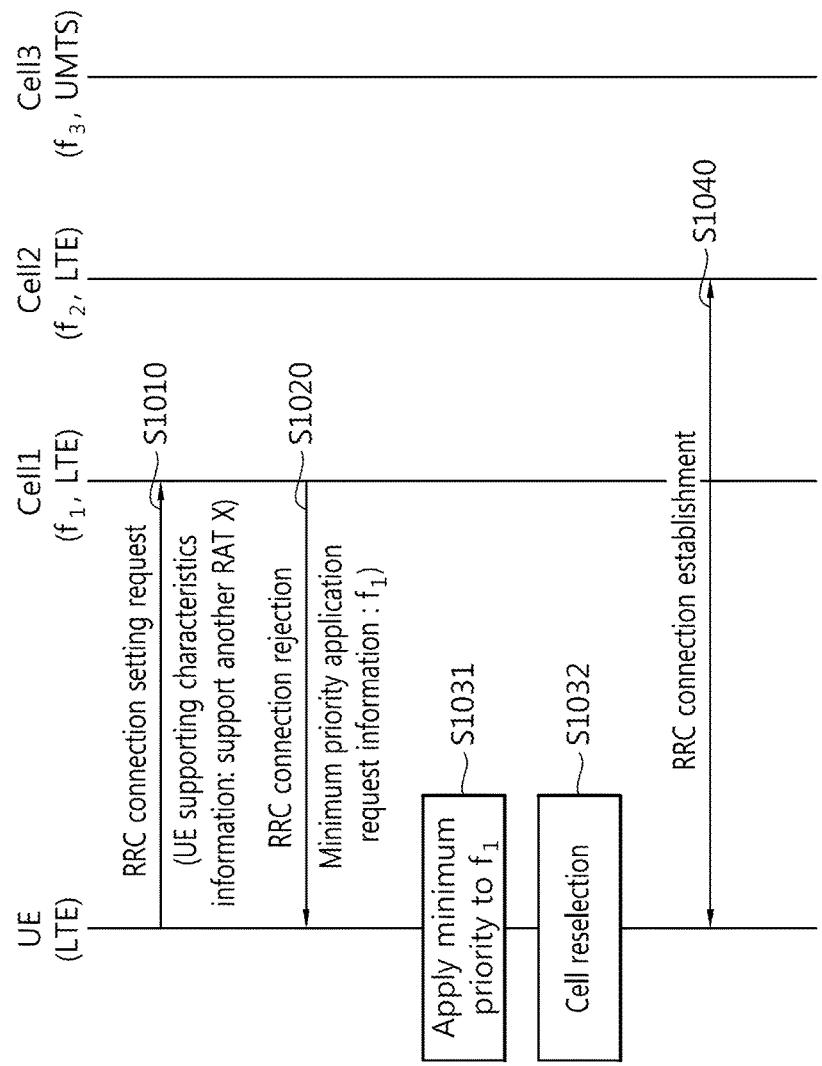
FIG. 10 is a flowchart illustrating a second example of cell reselection based on frequency priority handling according to an embodiment of the present invention.

FIG. 10 is a flowchart illustrating a second example of cell reselection based on frequency priority handling according to an embodiment of the present invention.

In the example of FIG. 10, it is assumed that the terminal may support only the LTE cell and camps on the cell 1 based on the LTE. The terminal is a terminal having performance capable of providing the UE supporting characteristics information. It is assumed that the terminal receives request for providing the UE supporting characteristics information from the network. It is assumed that a frequency priority is higher in the order of $f_1$, $f_2$, and $f_3$.

The terminal transmits an RRC connection setting request message to the cell 1 of the RRC connection establishment (S1010). The RRC connection setting request message may include the UE supporting characteristics information. The UE supporting characteristics information may indicate that the terminal cannot support other RAT (e.g., UMTS cell) except for the LTE cell.

The terminal receives the RRC connection rejection message from the cell 1 (S1020). The connection rejection message may include minimum priority application information. The cell 1 may know that the terminal cannot support another RAT by acquiring the UE supporting characteristics information. Accordingly, the minimum priority application request information may be set to indicate to apply the minimum priority to the current frequency. In the present example, it is assumed that the minimum priority application information is set to indicate to apply the minimum priority to a frequency $f_1$ of the LTE cell.

The terminal applies the minimum priority to the frequency $f_1$ of the LTE cell according to the minimum priority application request information (S1031), and performs cell reselection (S1032). The terminal may apply the minimum priority to the frequency $f_1$, and may apply a priority signaled from the network to frequencies $f_2$ and $f_3$. Accordingly, the terminal selects a cell 2 being the LTE cell as a target cell, and may camp on the cell 2. The terminal may drive the minimum priority timer associated with the minimum priority application with respect to the frequency $f_1$.

The terminal may perform an RRC connection establishment process with a cell 2 (S1040).

When the minimum priority application request information by the network reflects supporting characteristics of the terminal as illustrated in an example of FIG. 10, the terminal may select a cell of another RAT or a cell of another frequency of the same RAT according to an existing cell reselection estimation reference. In contrast, when the minimum priority application request information does not reflect the supporting characteristics of the terminal, the terminal may automatically handle the priory and perform cell reselection.

Figure 11:
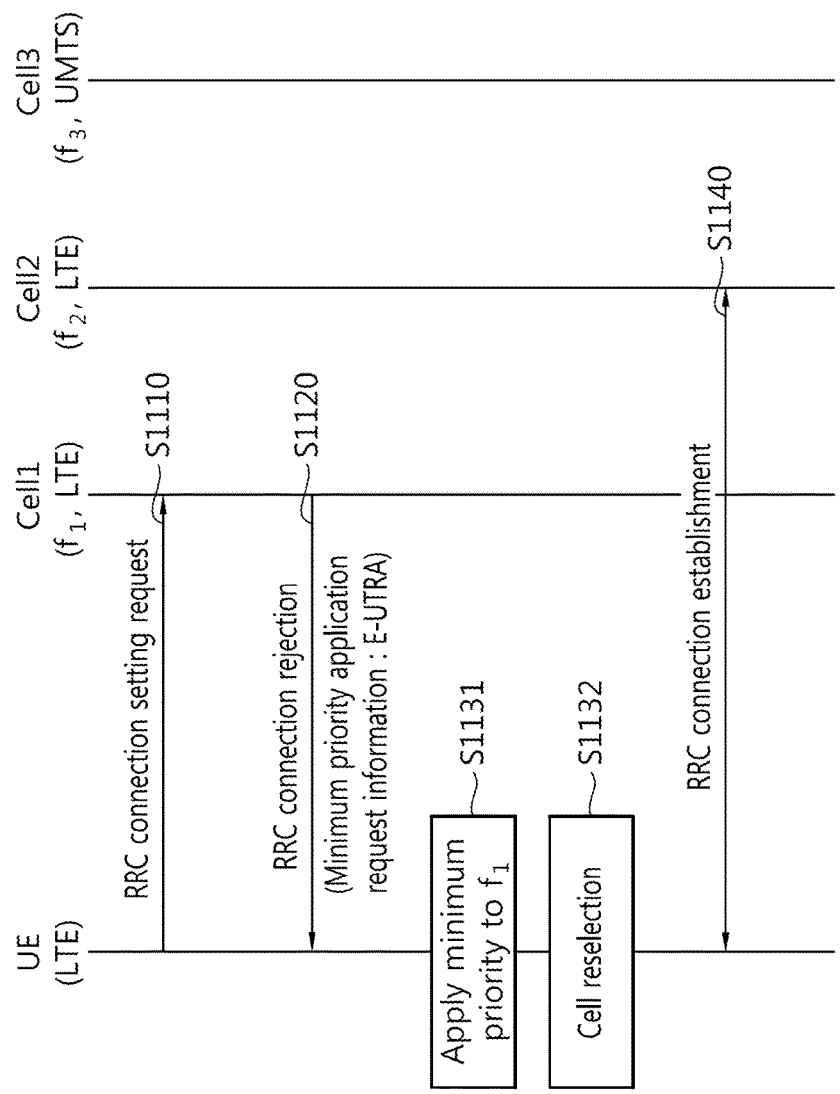
FIG. 11 is a flowchart illustrating a third example of cell reselection based on frequency priority handling according to an embodiment of the present invention.

FIG. 11 is a flowchart illustrating a third example of cell reselection based on frequency priority handling according to an embodiment of the present invention.

In the example of FIG. 11, it is assumed that the terminal may support only the LTE cell and may camp on a cell 1 based on the LTE. It is assumed that the terminal does not have performance capable of providing the UE supporting characteristics information or has the above performance but does not receive request for providing the UE supporting characteristics information from the network. It is assumed that the frequency priority is higher in the order of $f_1$, $f_2$, and $f_3$.

The terminal transmits an RRC connection setting request message to the cell 1 of the RRC connection establishment (S1110). The UE supporting characteristics information may not be included in the RRC connection setting request message.

The terminal receives the RRC connection rejection message from the cell 1 (S1120). The RRC connection rejection message may include the minimum priority application information. Since the cell 1 does not receive the UE supporting characteristics information from the terminal, the cell 1 may set the minimum priority application information regardless of taking into consideration UE supporting characteristics. Accordingly, even if the terminal cannot support to another RAT except for the LTE, the minimum priority application request information may be set to indicate to apply the minimum priority to all frequencies of the LTE.

The terminal which cannot support a cell of another RAT applies the minimum priority to a current serving frequency $f_1$ unlike indication of the minimum priority application request information (S1131), and performs cell reselection (S1132). The terminal may apply the minimum priority to the frequency $f_1$, and may apply a priority signaled from the network to frequencies $f_2$ and $f_3$. Accordingly, the terminal selects a cell 2 being the LTE cell as a target cell, and may camp on the cell 2. The terminal may drive the minimum priority timer associated with the minimum priority application, and the timer may be managed independently from a timer driven according to reception of other minimum priority application request information.

The terminal may operate regardless of the minimum priority application request information in an application side of the minimum priority. However, the terminal may operate based on the minimum priority application request information in an operation except for the minimum priority application. The terminal may stop a T300 and may start a T302 set to a (extended) wait time indicated by the minimum priority application information. While a corresponding time is driven, the terminal may not perform the RRC connection establishment. Further, the terminal may reset the MAC layer and may release the MAC setting.

The terminal may perform an RRC connection establishment process with the cell 2 (S1140).

Figure 12:
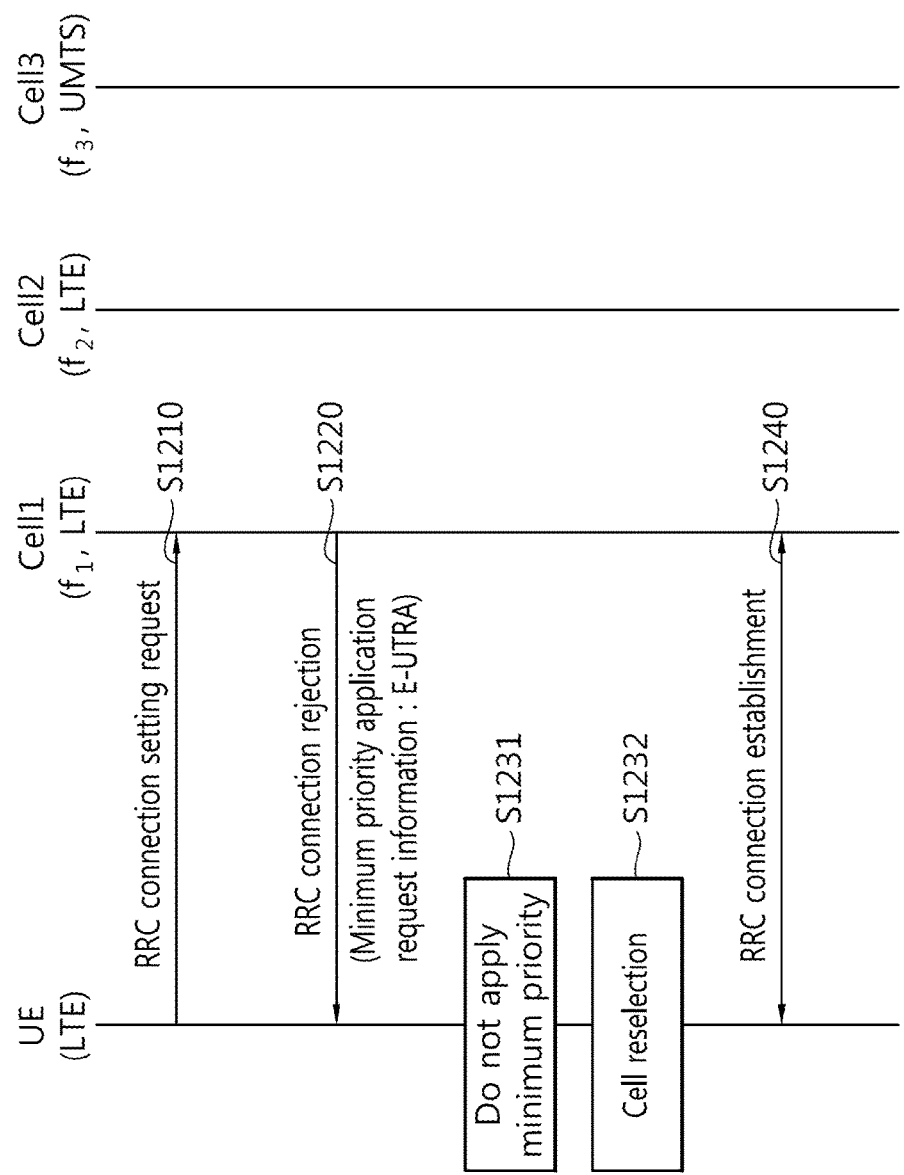
FIG. 12 is a flowchart illustrating a fourth example of cell reselection based on the frequency priority handling according to an embodiment of the present invention.

FIG. 12 is a flowchart illustrating a fourth example of cell reselection based on the frequency priority handling according to an embodiment of the present invention.

It is assumed that the terminal may support only an LTE cell and may camp on the cell 1 based on the LTE in the example of FIG. 12. It is assumed that the terminal does not have performance capable of providing the UE supporting characteristics information or has the above performance but does not receive request for providing the UE supporting characteristics information from the network. It is assumed that the frequency priority is higher in the order of $f_1$, $f_2$, and $f_3$.

The terminal transmits an RRC connection setting request message to the cell 1 of the RRC connection establishment (S1210). The UE supporting characteristics information may not be included in the RRC connection setting request message.

The terminal receives the RRC connection rejection message from the cell 1 (S1220). The RRC connection rejection message may include the minimum priority application information. Since the cell 1 does not receive the UE supporting characteristics information from the terminal, the cell 1 may set the minimum priority application information regardless of taking into consideration UE supporting characteristics. Accordingly, even if the terminal cannot support to another RAT except for the LTE, the minimum priority application request information may be set to indicate to apply the minimum priority to all frequencies of the LTE.

The terminal which cannot support a cell of another RAT may not apply the minimum priority unlike indication of the minimum priority application request information (S1231). Accordingly, the terminal may apply a priority signaled from the network to $f_1$, $f_2$, and $f_3$. Further, the terminal does not drive the minimum priority timer according to the minimum application request information. Meanwhile, the terminal may receive previously received minimum priority application request information to continuously apply during a drive of an associated minimum priority timer when a minimum priority with respect to a specific frequency is applied.

The terminal may be operated regardless of the minimum priority application request information in an application side the minimum priority, but may be operated based on the minimum priority application request information in an operation except for the minimum priority application. The terminal may stop a T300 and may start a T302 set to a (extended) wait time indicated by the minimum priority application information. While a corresponding time is driven, the terminal may not perform the RRC connection establishment. Further, the terminal may reset the MAC layer and may release the MAC setting.

The terminal performs cell reselection based on an applied priority (S1232). The terminal may select a cell 1 which is operated on a frequency $f_1$ as a target cell and may camp on the cell 1.

The terminal may perform an RRC connection establishment process with the cell 2 (S1240).

Meanwhile, the terminal may be limited to access a cell 1 within a specific time interval according to a (extended) wait time provided from the minimum priority application request information.

Figure 13:
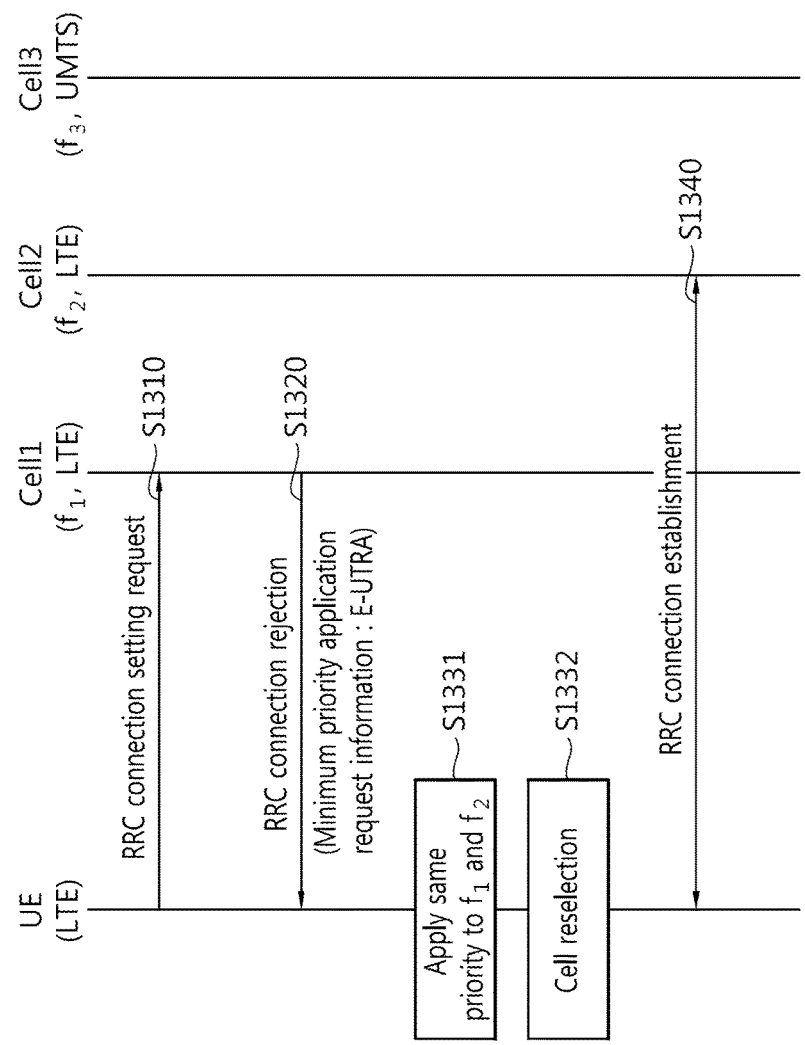
FIG. 13 is a flowchart illustrating a fifth example of cell reselection based on the frequency priority handling according to an embodiment of the present invention.

FIG. 13 is a flowchart illustrating a fifth example of cell reselection based on the frequency priority handling according to an embodiment of the present invention.

It is assumed that the terminal may support only an LTE cell and may camp on the cell 1 based on the LTE in the example of FIG. 13. It is assumed that the terminal does not have performance capable of providing the UE supporting characteristics information or has the above performance but does not receive request for providing the UE supporting characteristics information from the network. It is assumed that the frequency priority is higher in the order of $f_1$, $f_2$, and $f_3$.

The terminal transmits an RRC connection setting request message to the cell 1 of the RRC connection establishment (S1310). The UE supporting characteristics information may not be included in the RRC connection setting request message.

The terminal receives the RRC connection rejection message from the cell 1 (S1320). The RRC connection rejection message may include the minimum priority application information. Since the cell 1 does not receive the UE supporting characteristics information from the terminal, the cell 1 may set the minimum priority application information regardless of taking into consideration UE supporting characteristics. Accordingly, even if the terminal cannot support to another RAT except for the LTE, the minimum priority application request information may be set to indicate to apply the minimum priority to all frequencies of the LTE.

The terminal which cannot support another RAT may not apply the minimum priority may apply the same priority to all frequencies of a current RAT unlike indication of the minimum priority application request information. Accordingly, the terminal may apply a priority signaled from the network to $f_1$, $f_2$, and $f_3$ (S1331).

The terminal may start the minimum priority timer by applying the same specific priority to $f_1$ and $f_2$. The minimum priority timer may be set as a value indicated by the minimum priority application request information. The terminal may apply the same specific priority to the $f_1$ and $f_2$ during an operation of the minimum priority timer. Meanwhile, the terminal may receive previously received minimum priority application request information to continuously apply during a drive of an associated minimum priority timer when a minimum priority with respect to a specific frequency is applied.

The terminal may operate regardless of the minimum priority application request information in an application side of the minimum priority. However, the terminal may operate based on the minimum priority application request information in an operation except for the minimum priority application. The terminal may stop a T300 and may start a T302 set to a (extended) wait time indicated by the minimum priority application information. While a corresponding time is driven, the terminal may not perform the RRC connection establishment. Further, the terminal may reset the MAC layer and may release the MAC setting.

The terminal performs cell reselection based on an applied priority (S1332). The terminal may perform a rank based cell reselection with respect to the cell 1 and the cell 2 which are operated at frequencies $f_1$ and $f_2$ having the same priority. According to cell reselection estimation, the terminal may select the cell 2 and may camp on the cell 2.

The terminal may perform an RRC connection establishment process with the cell 2 (S1340).

Meanwhile, when the terminal determines the cell 1 as a target cell through cell reselection, access to the cell 1 within an (extended) wait time may be limited. In this case, the terminal may rapidly perform the RRC connection establishment process by selecting the cell 2 as the target cell.

The cell reselection according to the above UE characteristics based priority handling with reference to the accompanying drawings is applicable to a case where the terminal supports only a current frequency of a current RAT. In this case, the UE supporting characteristics information transmits the UE supporting characteristics information by adding the UE supporting characteristics information to the RRC connection setting request message. The UE supporting characteristics information may indicate to support only a current frequency. If the terminal receives the minimum priority application request information indicating to apply the minimum priority to a current frequency or all frequencies of the current RAT, the terminal may perform the cell reselection through the automatic priority handling. For example, the terminal may be configured to apply the minimum priority to only the current frequency, not to apply the minimum priority or to apply a specific priority.

When the terminal receives motion indication information (e.g., idle state motion information) to the RAT, the embodiment of the present invention is applicable. In this case, the terminal enters the idle state motion information but may be depend on the motion indication information. The terminal applies the minimum priority to a current frequency but may move into a current RAT. Alternatively, the terminal may apply the minimum priority to other RAT indicated by the motion indication information. The terminal may apply the minimum priority to the other RAT at a specific time interval. Accordingly, the terminal may perform idle mode motion.

According to an embodiment of the present invention, although the terminal cannot support other RAT, an illogical operation for moving the terminal to the other RAT by force may be avoided because the network performs RRC connection rejection. As a result, the terminal may select a cell of another frequency of a RAT within a range supported from the terminal or a current frequency. Accordingly, an action of the terminal which cannot be expected by the network is prevented, and service continuity with respect to the terminal may be improved.

Figure 14:
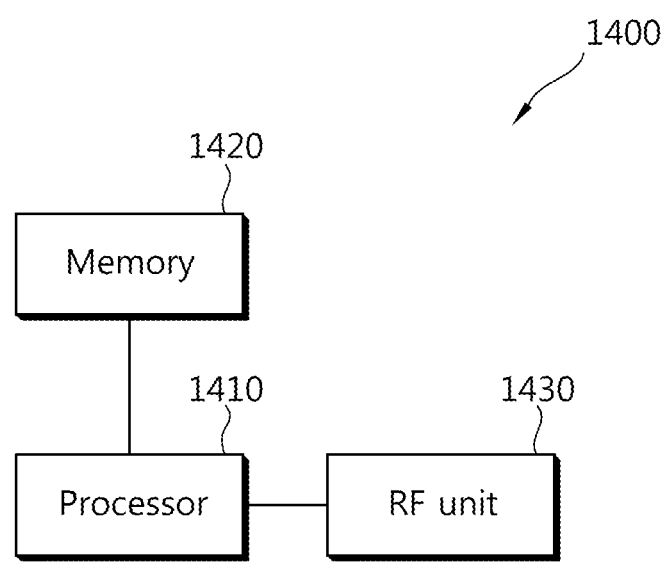
FIG. 14 is a block diagram illustrating a wireless apparatus according to an embodiment of the present invention.

FIG. 14 is a block diagram illustrating a wireless apparatus according to an embodiment of the present invention.

Referring to FIG. 14, the wireless apparatus 1400 includes a processor 1410, a memory 1420, and a radio frequency (RF) unit 1430. The processor 1410 performs the proposed functions, processes and/or methods. The processor 1410 may be configured to transmit supporting characteristics of the wireless apparatus to the network. The processor 1410 may be configured to set the minimum priority application request information according to the supporting characteristics of the terminal. The processor 1410 may be configured to handle a frequency priority for cell reselection based on the supporting characteristics of the wireless apparatus and the minimum priority application request information, and to perform the cell reselection. The processor 2010 may be configured to implement the embodiment of the present invention with reference to FIGS. 8 to 13.

The RF unit 1430 is connected to the processor 1410, and sends and receives radio signals.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the exemplary embodiment is implemented by software, the aforementioned technique may be implemented by a module (a process, a function, and the like) performing the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for handling a frequency priority by a user equipment (UE) in a wireless communication system, the method comprising:
   determining whether or not the UE supports non-long term evolution (LTE) which is a radio access technology (RAT) other than LTE;
   transmitting, to a first cell on a first LTE frequency, a radio resource control (RRC) connection configuration request including UE supporting characteristics information, wherein the UE supporting characteristics information indicates whether or not the UE supports non-LTE;
   receiving, from the first cell, a RRC connection rejection including lowest priority application request information in response to the UE supporting characteristics information, wherein the lowest priority application request information indicates a frequency to apply a lowest priority;
   applying the lowest priority to the frequency indicated by the lowest priority application request information; and
   reselecting a second cell on a second LTE frequency or a third cell on a non-LTE frequency based on the applied lowest priority,
   wherein
   if the UE does not support non-LTE, the lowest priority application request information indicates to apply the lowest priority to the first LTE frequency and the UE reselects the second cell on the second LTE frequency other than the first LTE frequency, and
   if the UE supports non-LTE, the lowest priority application request information indicates to apply the lowest priority to all LTE frequencies, which include the first LTE frequency and the second LTE frequency, and the UE reselects the third cell on the non-LTE frequency.

2. The method of claim 1, further comprising receiving information indicating whether to allow transmission of the UE supporting characteristics information, and
   the UE supporting characteristics information is transmitted when the transmission is allowed.

3. A user equipment (UE), the UE comprises:
   a Radio Frequency (RF) unit that sends and receives radio signals; and
   a processor, functionally coupled to the RF unit, that:
   determines whether or not the UE supports non-long term evolution (LTE) which is a radio access technology (RAT) other than LTE,
   controls the RF unit to transmit, to a first cell on a first LTE frequency, a radio resource control (RRC) connection configuration request including UE supporting characteristics information, wherein the UE supporting characteristics information indicates whether or not the UE supports non-LTE, controls the RF unit to receive, from the first cell, a RRC connection rejection including lowest priority application request information in response to the UE supporting characteristics information, wherein the lowest priority application request information indicates a frequency to apply a lowest priority, applies the lowest priority to the frequency indicated by the lowest priority application request information, and reselects a second cell on a second LTE frequency or a third cell on a non-LTE frequency based on the applied lowest priority, wherein if the UE does not support non-LTE, the lowest priority application request information indicates to apply the lowest priority to the first LTE frequency and the UE reselects the second cell on the second LTE frequency other than the first LTE frequency, and if the UE supports non-LTE, the lowest priority application request information indicates to apply the lowest priority to all LTE frequencies, which include the first LTE frequency and the second LTE frequency, and the UE reselects the third cell on the non-LTE frequency.

4. The UE of claim 3, wherein the UE supporting characteristics information is a flag type.

5. The UE of claim 3, wherein UE supporting characteristics information includes a list of RAT which the UE supports.

6. The method of claim 1, wherein the UE supporting characteristics information is a flag type.

7. The method of claim 1, wherein UE supporting characteristics information includes a list of RAT which the UE supports.

* * * * *